US006763866B1

(12) United States Patent
Nguyen et al.

(10) Patent No.: US 6,763,866 B1
(45) Date of Patent: Jul. 20, 2004

(54) REINFORCED WEDGE-INSERT CONSTRUCTION FOR EXTENDED MOBILITY TIRES

(75) Inventors: Gia Van Nguyen, Rossignol (BE); Laurent Colantonio, Bastogne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/869,921

(22) PCT Filed: Feb. 3, 1999

(86) PCT No.: PCT/US99/02270

§ 371 (c)(1),
(2), (4) Date: Jul. 5, 2001

(87) PCT Pub. No.: WO00/46047

PCT Pub. Date: Aug. 10, 2000

(51) Int. Cl.⁷ .......................... B60C 17/00; B60C 17/08; B60C 9/00
(52) U.S. Cl. .................. 152/517; 152/516; 152/522; 152/555
(58) Field of Search .......................... 152/517, 516, 152/522, 520, 555

(56) References Cited

U.S. PATENT DOCUMENTS

| 3,464,477 A | | 9/1969 | Verdier | |
| 3,954,131 A | * | 5/1976 | Hoshino et al. | 152/517 |
| 4,111,249 A | | 9/1978 | Markow | |
| 4,287,924 A | | 9/1981 | Deck et al. | |
| 5,158,627 A | * | 10/1992 | Saneto et al. | 152/510 |
| 5,368,082 A | | 11/1994 | Oare et al. | |
| 5,427,166 A | | 6/1995 | Willard, Jr. | |
| 5,427,176 A | * | 6/1995 | Hayashi et al. | 152/517 |
| 5,511,599 A | | 4/1996 | Willard, Jr. | |
| 5,871,600 A | * | 2/1999 | Oare et al. | 152/458 |

FOREIGN PATENT DOCUMENTS

| EP | 0385192 | 9/1990 |
| EP | 0822105 | 2/1998 |
| EP | 0911188 | 4/1999 |
| FR | 2261888 | 9/1975 |
| WO | WO 98/54008 | * 12/1998 |

* cited by examiner

*Primary Examiner*—Jeff H. Aftergut
*Assistant Examiner*—Justin Fischer
(74) *Attorney, Agent, or Firm*—Howard M. Cohn (57) ABSTRACT

A pneumatic radial ply tire (50) has a tread (52), a carcass (61) with two sidewalls (77, 78), a single radial ply (70) reinforced with inextensible metal cords, two annular beads (36a', 36b'), and a belt structure (58) located radially between the tread and the radial ply structure (56). Each sidewall (77, 78) is reinforced with wedge inserts (59a, 59b) containing stiffener layers (72a, 72b, 73a, 73b) that carry the compressive loading to which the tire is subjected during runflat operation. The incorporation of wedge-insert stiffeners (72a, 72b, 73a, 73b) provides a light-weight runflat tire having a simplified construction.

7 Claims, 4 Drawing Sheets

REINFORCED WEDGE-INSERT CONSTRUCTION FOR EXTENDED MOBILITY TIRES

TECHNICAL FIELD

This invention relates to pneumatic radial-ply runflat tires and ways to increase the bending stiffness of sidewall wedge inserts.

BACKGROUND OF THE INVENTION

Various methods have been devised for enabling the safe, continued operation of unpressurized or underpressurized vehicle tires with the intent of minimizing further damage to the uninflated tire and without simultaneously compromising vehicle handling over a distance from the location where the tire has lost its pressure to a place desired by the driver, such as a service station where the tire can be changed. Loss of tire pressure can result from a variety of causes, including puncture by a foreign object such as a nail or other sharp object piercing the pneumatic tire installed on a vehicle.

Pneumatic tires designed for sustained operation under conditions of unpressurization or underpressurization are also called runflat tires, as they are capable of being driven in the uninflated, or what would generally be called the "flat" condition. A conventional pneumatic tire collapses upon itself when it is uninflated and is carrying the weight of a vehicle. The tire's sidewalls buckle outward in the circumferential portion of the tire where the tread contacts the ground, making the tire "flat".

The term "runflat" is generally used to describe a tire that is designed such that the tire structure alone, in particular the structure of the sidewalls, has sufficient rigidity and strength to support the vehicle load when the tire is operated without being inflated. The sidewalls and internal surfaces of the tire do not collapse or buckle onto themselves, and the tire does not otherwise contain or use other supporting structures or devices to prevent the tire from collapsing.

In general, runflat tires incorporate sidewalls that are thicker and/or stiffer than a conventional non-runflat tire so that the tire's load can be carried by an uninflated tire with minimum adverse effects upon the tire itself and upon vehicle handling until such reasonable time as the tire can be repaired or replaced. The typical methods used in sidewall thickening and stiffening include the incorporation of circumferentially disposed wedge inserts in the inner peripheral surface of the sidewall portion of the carcass, which is the region in the tire usually having the lowest resistance to deformation under vertical loading. In such runflat tire designs, each sidewall is thickened in such a way that its overall thickness is increased in the region between the bead and the tread shoulder. The inserts in each sidewall, in combination with the plies, add rigidity to the sidewalls in the absence of air pressure during runflat operation. Such reinforced sidewalls, when operated in the uninflated condition, experience a net compressive load in the region of the sidewall that is in the road-contacting portion of the tire. Also, the bending stresses on the sidewalls are such that the outer portions of the reinforced sidewalls experience tensile forces while the inner portions experience compression stresses during runflat operation.

U.S. Pat. No. 5,368,082 ('082) of Oare et al, having a common assignee with the present invention, discloses a low aspect ratio, runflat, pneumatic radial ply tire which employs special sidewall inserts to improve stiffness. Approximately six additional pounds of weight per tire was required to support an 800 lb load in this uninflated tire. This earlier invention, although superior to prior attempts at runflat tire design, still imposed a weight penalty that could be offset by the elimination of a spare tire and the tire jack. However, this weight penalty becomes even more problematic in the design of tires having higher aspect ratios. The '082 Patent teaches a sidewall construction for runflat tires in which the tire is constructed with two plies, an inner liner and two reinforcing wedge inserts in each sidewall. The two inserts in each sidewall are disposed such that one insert is located between the two plies while the other insert is located between the inner liner and the first or innermost ply.

U.S. Pat. Nos. 5,427,166 and 5,511,599 of Willard, Jr., and assigned to Michelin Corporation disclose the addition of a third ply and the addition of a third insert in the sidewall to theoretically improve the runflat performance of a runflat tire over that of the '082 Patent discussed above. These two Michelin patents discuss some of the load relations that occur in the uninflated condition of the tire and demonstrate that the principle disclosed in the '082 patent can be applied to additional numbers of plies and inserts.

However, use of large amounts of rubber to stiffen the sidewall members, as in the Michelin patents previously discussed, usually increase flexure heating and lead to earlier tire failure during runflat operation. This is especially so when the tire is operated at high speeds. Therefore, one goal of runflat tire design is to minimize the number of wedge inserts used to stiffen each sidewall and reduce the total amount of elastomeric wedge insert material used in a runflat tire.

While the increased resistance to compression deflection of the multiple inserts tends to prevent the collapse of the uninflated loaded tire, the use of multiple plies and more than one reinforcing wedge insert in each sidewall, has drawbacks which include the above mentioned increase in tire weight and flexure-induced heat build up. Such designs also increase the tire's complexity in ways that adversely affect manufacturing and quality control.

U.S. Pat. No. 3,464,477 of Henri Verdler, and assigned to Michelin Corporation discloses a pneumatic tire particularly for off-highway (OTR) use wherein the inflated tire is to be protected against damage such as cuts and abrasion to the sidewalls when the tire is used on rocky or rough ground. Although this is not a runflat design, there are useful teachings presented since the inventor has determined that sidewall damage from such OTR operation can be ameliorated by reinforcing the tire sidewalls: "surprisingly . . . the sidewalls should be reinforced inwardly of the carcass plies." The disclosed reinforcement of each sidewall is a single reinforcing wedge insert ("elastomeric reinforcement") which has a maximum thickness at the mid height of the sidewall of the tire between about 1% and 3% of the overall maximum width of the tire, the reinforcement tapering toward its edges, that is toward the tread and toward the corresponding bead of the sidewall and extending about half of the height of the tire. The elastomeric composition is not very important other than that it should not have a hysteretic loss greater than 25%. The elastomer may contain one or more plies of elastic cords of metallic or non-metallic type arranged radially or only slightly inclined to the radial direction, for example at an angle between about 10 and 30 degrees to the radial. Suitable elastic cords for reinforcing the internal layer of the tire are polyamide cords, such as nylon, or elastic metallic cables, preferably having a modulus of elasticity less than 5000 DaN/mm$^2$. The preferred embodiment of the sidewall reinforcement "layers" is summarized in claim 6 and includes "a pair of plies of elastic polyamide cords, . . . the cords of one ply crossing the cords of the other ply, said layers and said plies therein terminating short of said bead and the edge of said tread adjacent to said sidewall." There is no discussion or specification of the length or position of the ends of one ply relative to the other ply in the pair of plies. The disclosed design, with specific limits on insert thickness and insert ply cord angles, provides sidewall reinforcement suitable for providing "surprisingly increased resistance to damage . . . cutting or gashing by cutting objects" when operating an inflated tire on rocky terrain.

Clearly, the goal in runflat tire design is to provide a low-cost, light-weight tire that gives good runflat vehicle handling as well as good service life during runflat operation.

Objects of the Invention

It is an object of the present invention to provide a pneumatic, radial runflat ply tire as defined in one or more of the appended claims and, as such, having the capability of being constructed to accomplish one or more of the following subsidiary objects.

One object of the present invention is to provide a pneumatic radial runflat ply tire with a simplified design that allows for improved manufacturing quality control.

Another object of the present invention is to provide a pneumatic radial runflat ply tire having a reduced weight as compared with prior art designs.

Another object of the present invention is to provide a pneumatic radial runflat ply tire having a reduced heat generating potential during runflat operation as compared with prior art designs.

Still another object of the present invention is to provide a pneumatic radial runflat ply tire having good normal inflation handling and ride characteristics as well as good runflat handling properties and runflat durability and operational life.

SUMMARY OF THE INVENTION

The present invention relates to a pneumatic radial ply runflat tire having a tread, a carcass comprising a radial ply structure, a belt structure located between the tread and the radial ply structure, an inner liner and two sidewalls each reinforced by a single circumferential wedge insert between the radial ply structure and the inner liner that contains a pair of wedge-insert stiffener layers circumferentially disposed therein. Within each sidewall wedge insert, a first stiffener located closest to the inner liner has a radial width preferably within the range of the range of 30 percent to 50 percent of the total radially oriented span of the respective wedge insert. A second stiffener within each sidewall wedge insert, i.e., the one located most distant from the innerliner, has a radial width that is preferably within the range of between 60 percent to 90 percent and most preferably in the range of 70 percent to 80 percent of the total radially oriented span of the respective wedge insert. The radially innermost and outermost ends of the first wedge-insert stiffener are located radially within the radial span of the second wedge-insert stiffener. Each wedge-insert stiffener comprises parallel-aligned monofilaments, wires or metal cords, which are angularly oriented preferably between 20 degrees and 55 degrees with respect to the radial direction. The parallel-aligned monofilaments, wires or cords of each of the respective two wedge-insert stiffeners within each sidewall wedge are angularly oriented in opposite directions with respect to the radial direction. The wedge-insert stiffeners can be constructed of parallel-aligned nylon or wire monofilaments, or of parallel-aligned metal cords.

Other benefits and advantages of the invention will become apparent to those skilled in the art to which it pertains upon a reading and understanding of the following detailed specification.

BRIEF DESCRIPTION OF THE DRAWINGS

The structure, operation, and advantages of the invention will become further apparent upon consideration of the following description taken in conjunction with the accompanying drawings, wherein.

DEFINITIONS

"Apex" means an elastomeric filler located radially above the bead core and between the plies and the turnup plies.

"Aspect Ratio" means the ratio of the section height of a tire to its section width; also refers to the cross-sectional profile of the tire; a low-profile tire, for example, has a low aspect ratio.

"Axial" and "Axially" means the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt Structure" or "Reinforcement Belts" or "Belt Package" means at least two annular layers or plies of parallel cords, woven or unwoven, underlying the tread, unanchored to the bead, and having both left and right cord angles in the range from 18° to 30° relative to the equatorial plane of the tire.

"Breakers" or "Tire Breakers" means the same as belt or belt structure or reinforcement belts.

"Carcass" means the tire structure apart from the belt structure, tread, undertread over the plies, but including the beads.

"Casing" means the carcass, belt structure, beads, sidewalls and all other components of the tire excepting the tread and undertread.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers, with which the plies and belts are reinforced.

"Crown" or "Tire Crown" means the tread, tread shoulders and the immediately adjacent portions of the sidewalls.

"Equatorial Plane" means the plane perpendicular to the tire's axis of rotation and passing through the center of its tread; or the plane containing the circumferential centerline of the tread.

"EMT" means "extended mobility tire," which means the same as "runflat tire."

"Footprint" means the contact patch or area of contact of the tire tread with a flat surface at a given speed and under a given load and pressure.

"Gauge" refers to thickness.

"Inner liner" means the layer or layers of elastomer or other material that form the inside surface of a tubeless tire and that contain the inflating fluid within the tire.

"Insert" means the same as "wedge insert," which is the crescent-shaped or wedge-shaped reinforcement typically used to reinforce the sidewalls of runflat-type tires; it also refers to the elastomeric non-crescent-shaped insert that underlies the tread.

"Lateral" means a direction parallel to the axial direction.

"Normal inflation pressure" means the specific load at a specific inflation pressure assigned by the appropriate standards organization for the service condition of the tire.

"Normal load" means the specific load at a specific inflation pressure assigned by the appropriate standards organization for the service condition for the tire.

"Ply" means a cord-reinforced layer of rubber-coated radially deployed or otherwise parallel cords.

"Radial" and "radially" mean directions radially toward or away from the axis of rotation of the tire.

"Radial ply structure" means the one or more carcass plies or which at least one ply has reinforcing cords oriented at an angle of between 65° and 90° with respect to the equatorial plane of the tire.

"Radial ply tire" means a belted or circumferentially-restricted pneumatic tire in which at least one ply has cords which extend from bead to bead and are laid at cord angles between 65° and 90° with respect to the equatorial plane of the tire.

"Runflat" or "runflat tire" is a pneumatic tire that is designed to provide limited service while uninflated or underinflated.

"Section height" means the radial distance from the nominal rim diameter to the outer diameter of the tire at its equatorial plane.

"Section width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tangential" and "tangentially" refer to segments of circular curves that intersect at a point through which can be drawn a single line that is mutually tangential to both circular segments.

"Tread cap" refers to the tread and the underlying material into which the tread pattern is molded.

"Tread width" means the arc length of the tread surface in the plane includes the axis of rotation of the tire.

"Wedge insert" means the same as "insert," which is the sidewall reinforcement used in runflat tires.

DETAILED DESCRIPTION OF THE PREFERRED EMBODIMENT

Prior Art Embodiment

Figure 1:
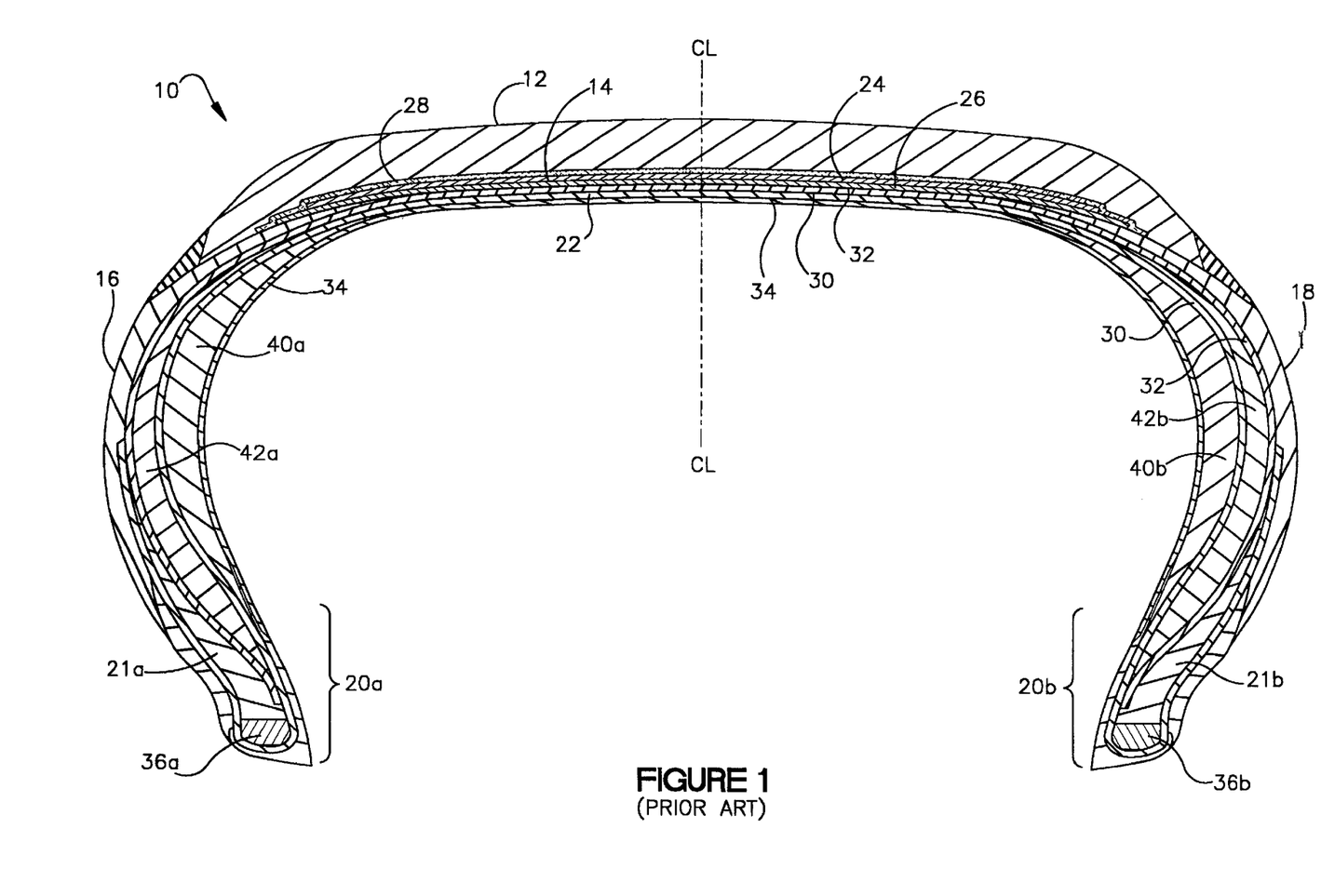
FIG. 1 is a cross-sectional view of a prior art runflat tire design incorporating multiple wedge inserts in each sidewall and multiple plies in the ply structure.

With reference to FIG. 1, a cross section of a typical prior art, pneumatic radial runflat tire 10 is illustrated. The tire 10 has a tread 12, a belt structure 14 comprising belts 24,26, a pair of sidewall portions 16,18, a pair of bead regions 20a,20b and a carcass structure 22. The carcass 22 comprises a first ply 30 and second ply 32, a gas-impervious inner liner 34, a pair of beads 36a,36b, a pair of bead filler apexes 21a,21b, a first pair of sidewall wedge inserts 40a, 40b, and a second pair of inserts 42a,42b. The first or innermost wedge inserts 40a,40b are located between the inner liner 34 and the first ply 30, and the second wedge inserts 42a,42b are located between the first ply 30 and second ply 32. The fabric overlay 28 is disposed beneath, or radially inward of, tread 12 and on top of, or radially outward from, belt structure 14. The reinforced sidewall portions 16,18 of carcass structure 22 give the tire 10 a limited runflat capability.

As can be seen from FIG. 1, the structural reinforcement in the sidewall area of the tire 10, i.e., the wedge inserts 40a,40b,42a,42b, substantially increase the overall thickness of the sidewall portions 16,18. This generalized prior art runflat tire design shows the more or less uniformly thickened sidewalls that characterize runflat tire designs. The insert-reinforced sidewalls are necessary to support the tire's load with minimal sidewall deflection when the tire 10 is in an uninflated or underinflated state. Such runflat tire designs provide good vehicle handling and performance under conditions of full inflation, and they give acceptable runflat vehicle handling and runflat operational life when the tire is underinflated or uninflated. Runflat tires generally weigh more than equivalent non-runflat-capable tires, and their greater structural complexity results in additional time consuming manufacturing and quality control.

Figure 2:
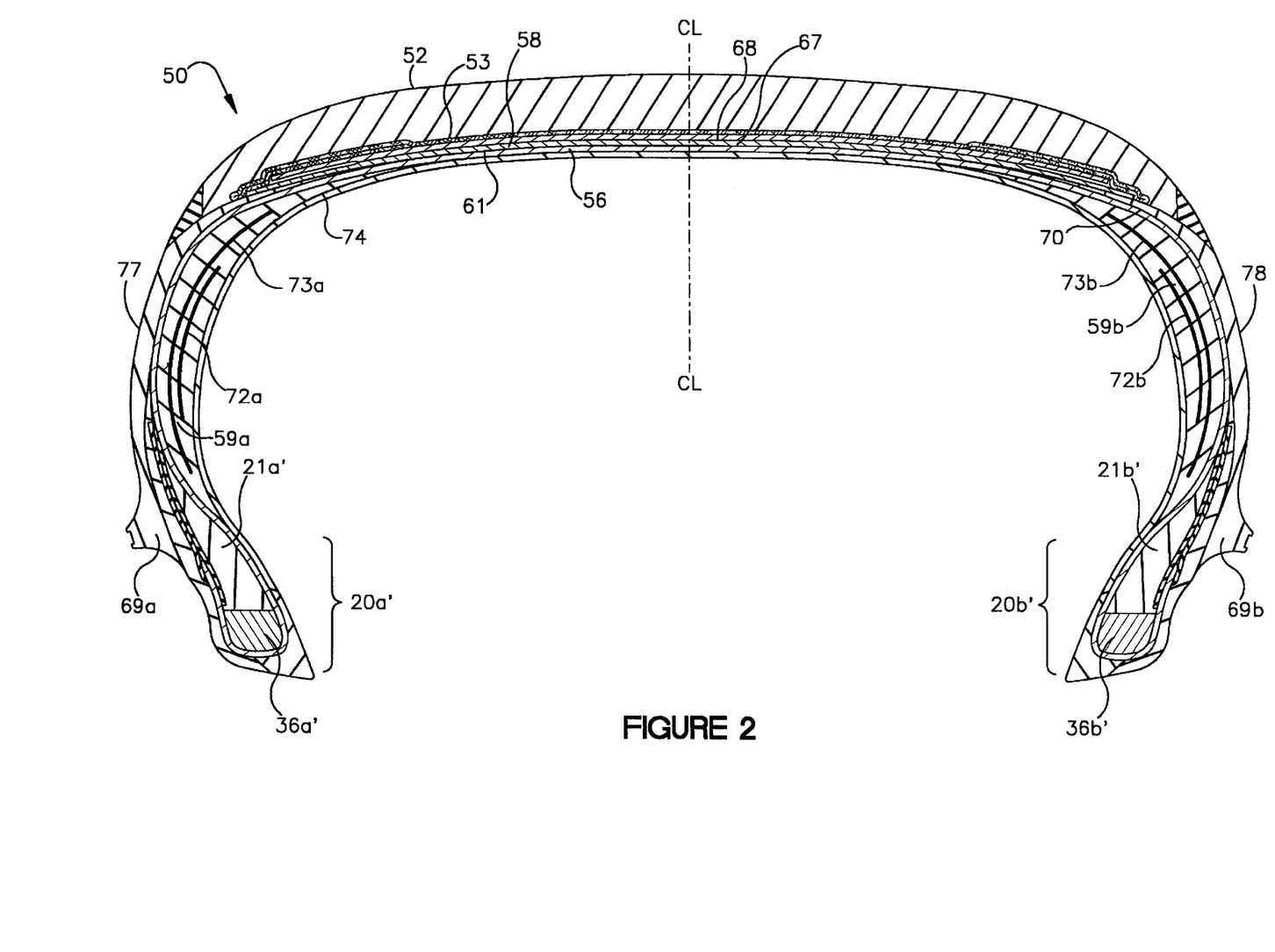
FIG. 2 is a cross-sectional view of a runflat tire in accordance with the present invention.

FIG. 2 shows a cross-sectional view of a tire 50 employing the features of the present invention. The tire 50 differs from prior art tire 10 of FIG. 1 in one significant way: it has only a single wedge insert 59a,59b in each sidewall 77,78, respectively, and each of those individual wedge inserts is reinforced by two stiffening reinforcement layers 72a,72b and 73a,73b, respectively, which are herein referred to as wedge-insert stiffeners. The structural details of the wedge-insert stiffeners 72a,72b are shown in greater detail in FIGS. 3A and 3B. Basically, each set of wedge-insert stiffeners 72a,73a is made of parallel-aligned nylon or wire monofilaments or metal cords which are arranged as shown in FIG. 3B.

Stresses in Wedge Inserts

Figure 3A:
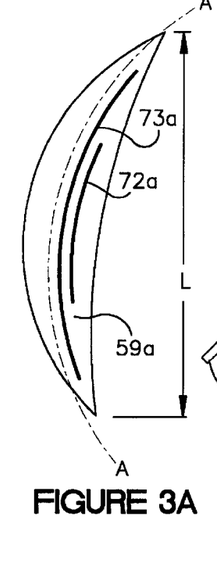
FIG. 3A is a cross-sectional detail view of the reinforced sidewall wedge insert for the runflat tire of the present invention.
Figure 3B:
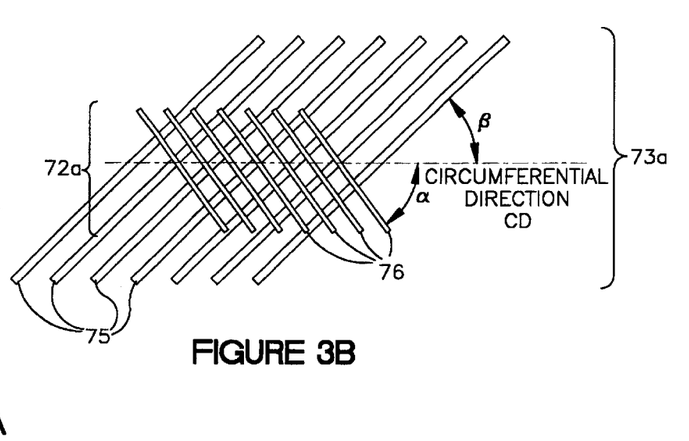
FIG. 3B shows the crossed wires of the respective wedge-insert stiffening reinforcements.

FIG. 3A shows a schematic, detailed cross-sectional view of the wedge insert 59a depicted in FIG. 2. Wedge insert 59b has essentially the same construction as wedge insert 59a and therefore is not discussed in detail herein. When the tire 50 of FIG. 2 is partially or completely deflated, the portion of the wedge insert 59a that is in the ground-contacting portion of the tire 50 experiences large vertical compressive forces that cause the wedge insert to bend as the sidewall undergoes partial collapse. In FIG. 3A, the neutral bending axis A—A, which is the interface between the portions of the wedge insert 59a that are in compression and tension, is shown. More specifically, referring to FIG. 3A, the portion of the wedge insert 59a that is to the right of the neutral axis A—A undergoes compressive stresses, while the portion to the left of the neutral axis experience tensile stresses. The two stiffening reinforcements 72a,73a are located in the compression-load-bearing side of the neutral bending axis A—A within the wedge insert 59a.

The wedge-insert stiffeners 72a,73a provide the wedge insert 59a with additional resistance to compression-induced strain. If the wedge insert 59a were not reinforced with the stiffening reinforcements, the bending stresses would be such that a maximum compressive stress would arise in the approximate center of the right-most (or inner-most) edge of the elastomeric compound of which the circumferentially disposed wedge insert 59a is made. Such compressive stresses would be of a cyclical nature during runflat operation. That is, during runflat operation, the combination of extreme compressive stresses of a cyclical nature with the inherent hysteresis of the elastomeric compound, induce heat buildup and fatigue of the elastomeric material of which the wedge insert 59a is made. Failure during runflat operation is, in other words, hastened by a combination of cyclical-flexure-induced heating and flexure fatigue failure of the elastomeric material.

The incorporation of the compression-load-bearing wedge-insert stiffeners 72a,73a allows a large portion of the cyclical compressive loading on the wedge insert 59a to be borne by the stiffeners which remove a large portion of the cyclical compressive loading from the elastomeric compound of which the wedge insert 59a is made. Accordingly, the maximum magnitude of the compressive stresses in the wedge insert can be reduced, which means that the amount of flexure-induced heating will be reduced, as will the cyclical maximum compression stress which otherwise contributes to fatigue failure during runflat operation. The tire will thereby achieve an improvement in its runflat service life. Additionally, the wedge-insert stiffeners, when made of metal, will, by means of thermal conductivity, tend to distribute and dissipate flexure-induced heating to a larger portion of the total tire body.

Structure of the Invention

The reinforcing layer 72a, shown in FIG. 3A, comprises parallel cords 76, shown in FIG. 3B. The reinforcing layer 73a, shown in FIG. 3A, comprises substantially parallel cords 75, shown in FIG. 3B. The cords are preferably aligned in a parallel configuration because it leads to the best shear stress distribution, which provides the best resistance to compression. Referring to FIG. 3A, the vertical extent of the wedge-insert stiffener 72a is preferably in the range of 25 percent to 60 percent and most preferably in the range of 30 percent to 50 percent of the total radially oriented span L of the respective wedge insert 59a (and 59b in FIG. 2). The vertical extent of the stiffener 72a is no greater than 60 percent because the inflated handling of the tire will be affected by the too high sidewall stiffness and it is no less than 25 percent because the contribution to compression resistance would be negligible. The vertical extent of the wedge-insert stiffener 73a is preferably in the range of 60 percent to 90 percent and most preferably in the range of 70 percent to 80 percent of the total radially oriented span L of the wedge insert 59a (and 59b in FIG. 2). The vertical extent of wedge-insert stiffener 73a is no greater than 90 percent because of the risks of reduced durability at the edge of the stiffener and no less than 60 percent because of the necessity for a step off from 72a to prevent the localization of two weak points at the edges of the stiffener 73a, which could cause a high stress concentration. The respective parallel-aligned monofilaments, aligned nylon or wire monofilaments or metal cords 75,76 of each set of wedge-insert stiffeners 72a,73a, respectively, are preferably oriented at an angle of between 20 degrees and 55 degrees (extending through the insert and centerline C-L as shown in FIG. 2) with respect to the circumferential direction (CD), as shown by the angles $\alpha$ and $\beta$ in FIG. 3B, which is a view of the wedge-insert stiffeners from a direction is more or less perpendicular to the curved plane of the two sets of layers of stiffening reinforcements 72a,73a. The parallel-aligned cords 75,76 of inserts 59a,59b respectively, lie in transverse relation to each other. While shown as being nearly perpendicular to each other, it is within the terms of the invention to change their relation with the angle ranges mentioned before. The angle of the wedge-insert stiffeners 72a,73a is no more than 55 degrees with respect to the circumferential direction because the monofilament or cords may be affected by a poor durability to buckling and no less than 20 degrees because the resistance to compression will be negligible.

Before explaining in detail the compression-bearing dynamics of operation of the wedge-insert stiffeners, it should be borne in mind that the radial ply 70 shown in FIG. 2 experiences and bears cyclical tensile loading during normal inflated operation and especially during runflat operation when the portion of the sidewalls that are most adjacent to the ground-contacting portion of the tire undergo the greatest deformation.

Dynamics of Operation of the Inventive Concept

The dynamics of operation of the inventive concept that underlies the use of wedge-insert stiffeners can be understood by reference to FIGS. 4A, 4B, and 4C and FIGS. 5A, 5B, and 5, which show the compressive stresses associated with the bending of elastomeric beams that are subjected to opposing forces of compression.

Figure 4A:
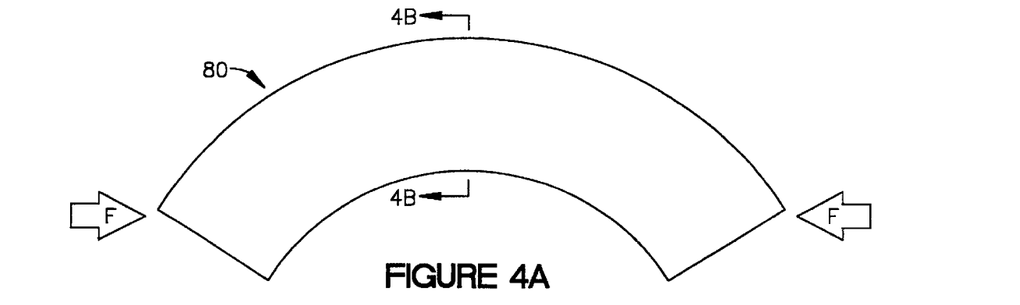
FIG. 4A shows a square section beam being loaded in compression and deformed.
Figure 4B:
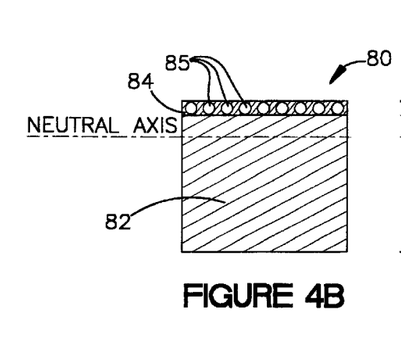
FIG. 4B shows a cross-sectional view of the beam of FIG. 4A.
Figure 4C:
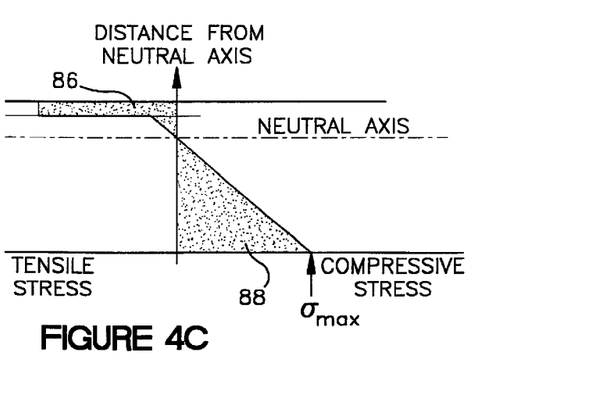
FIG. 4C is a diagram of the stresses within the beam of FIG. 4A.

FIG. 4A shows a square-section beam 80 of elastomeric material that is loaded in compression, and deflected in bending, by opposing forces F. Beam 80 represents an idealized segment of the wedge insert 59a shown in FIGS. 2 and 3A without the wedge-insert stiffeners of the present invention. It should, of course, be acknowledged that the actual wedge inserts 59a,59b are crescent-shaped in cross section and, being circumferentially deployed, are essentially endless. FIG. 4B shows the beam 80 in cross section. The main body 82 of beam 80 is an elastomeric material while the upper region is a tensile-stress-bearing layer 84 that corresponds to the radial ply layer 70 of the tire 50 shown in FIG. 2. Tensile-stress-bearing radial cords 85 are shown in cross section in layer 84 of FIG. 4B. FIG. 4C shows a stress distribution curve for the cross-sectional portion shown in FIG. 4B; the location of the neutral axis is chosen for diagrammatic purposes only and does not reflect actual stress-strain data.

The stress distribution curve shown in FIG. 4C reflects the predominance of compressive stresses in that the area 88, which lies on the compression-stress side of the stress diagram, is much larger than the corresponding tensile-stress area 86. For the sake of clarity, it is acknowledged that the integrated multiplicative product of the compressive (or tensile) stress and the corresponding distance from the neutral axis is related directly to the resistance of beam 80 to bending flexure. In other words, the area 88 represents a compressive force which acts through a moment arm that is distributed across the region located between the neutral axis and the point $\sigma_{max}$ where maximum compressive stress is experienced in the elastomeric material of main body 82. A corresponding moment arm for tensile stresses also exists, but for the purposes of explaining the benefits of this invention, the limiting of the maximum compressive stress $\sigma_{max}$ is of specific interest.

Figure 5A:
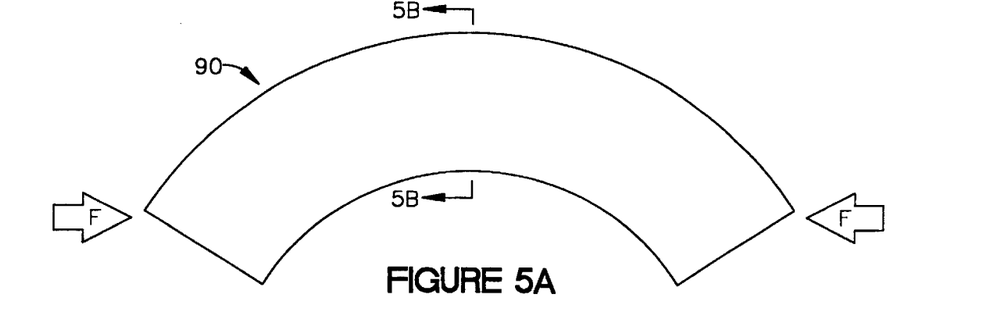
FIG. 5A shows a square section beam, with compression-bearing elements, being loaded in compression and deformed.
Figure 5B:
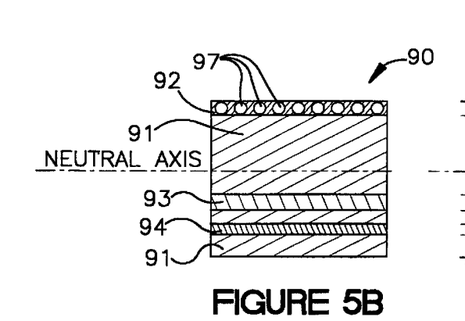
FIG. 5B shows a cross-sectional view of the beam of FIG. 5A.
Figure 5C:
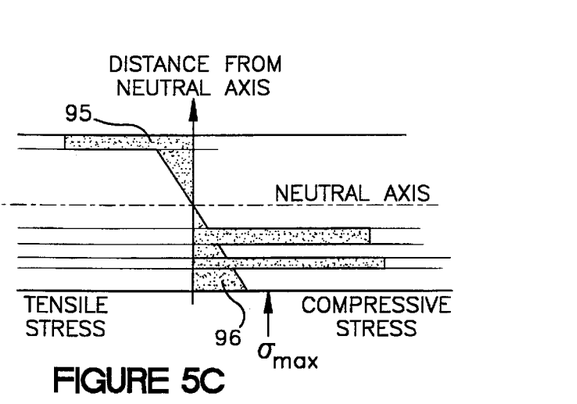
FIG. 5C is a diagram of the stresses within the beam of FIG. 5A.

FIGS. 5A, 5B, and 5C represent the effects of the incorporation of the present invention upon a compression-loaded beam 90 that is otherwise comparable to the beam 80 depicted in FIG. 4A. In FIG. 5A, opposing forces F place the beam 90 in compression and in a bent state of deflection which, as with the beam 80 of FIG. 4A, induces compressive and tensile stresses that are described in more detail as follows. FIG. 5B shows the beam 90 in cross section. In particular, FIG. 5B shows the tensile bearing layer 92, which corresponds to the radial ply layer 70 of the tire 50 shown in FIG. 2 and cords 97 embedded in elastomer 91 and corresponding to the radially aligned reinforcing cords of the radial ply layer 70. FIG. 5B also includes an idealized view of the two layers that correspond to the stiffening reinforcement layers 72a,72b,73a,73b shown in FIG. 2 and FIG. 3A. Referring to FIG. 5B, layer 93 corresponds to stiffening reinforcement 73a in FIG. 3A and layer 94 corresponds to stiffening reinforcement 72a.

The purpose of the wedge-insert stiffeners 72a,72b,73a, 73b is to bear significant portions of the compressive stresses which the wedge insert 59a, as shown in FIG. 3A, experiences during runflat operation. Accordingly, the stress distribution curve shown in FIG. 5C shows the respective layers 93,94 (which correspond to the stiffening reinforcements 72a,72b,73a,73b of FIGS. 2 and 3) bearing large portions of the compressive load of the deflected compression-loaded beam 90 of FIGS. 5A and 5B. The maximum stress $\sigma_{max}$ experienced by the elastomeric material 91, at the location most distant from the neutral axis, is less than the corresponding $\sigma_{max}$ shown in FIG. 4C, wherein wedge-insert stiffeners are not used to carry the cyclical compressive loading.

Since the maximum compressive stress $\sigma_{max}$ is less in the instance wherein the wedge-insert stiffeners of the present invention are deployed within the wedge inserts than when such stiffeners are not used, the elastomeric component of the wedge insert undergoes a reduced magnitude of cyclical compression, especially during runflat operation. Thus the incorporation of wedge-insert stiffeners in the wedge inserts, as set forth in the present invention, reduces the maximum compressive stress $\sigma_{max}$ and accordingly reduces the heat buildup due to the cyclical nature of the compressive loading during runflat operation. Fatigue failure resulting from cyclical flexure is also reduced because the maximum strain associated with the stress $\sigma_{max}$ is also reduced.

Materials

The respective parallel-aligned cords 75,76 within the stiffening reinforcements 72a,73b (FIG. 2) can be made from solid wire monofilaments or from metal cords. The inventors recognize that instead of wire monofilaments or metal cords, the wedge-insert stiffeners can also be made of nylon monofilaments, which also have substantial compression-load-bearing capacity in comparison to the elastomeric material 91 (FIG. 5B) of which the wedge inserts are made.

The inventors also recognize that by designing an appropriate sidewall wedge gauge distribution in conjunction with the physical properties (e.g., rigidity, tensile-stress-bearing properties) of the wire/cord wedge-insert stiffeners 72a,72b, 73a,73b, the tire designer can tailor the operational properties of tire 50 (FIG. 2) to a variety vehicle types and tire use applications as well as ride characteristics and vehicle handling characteristics in both normal-inflated operation and in runflat operation.

The present invention also includes the incorporation of the wedge-insert stiffeners 72a,72b,73a,73b with the tire designs having two or more radial plies that are reinforced with metal wires/cords and/or organic fibers/cords or combinations of metal and organic reinforcing fibers/wires/cords.

Manufacturing Sequence, Compared to Prior Art Tire

Another benefit of the present invention is its contribution to a potentially reduced number of manufacturing steps and the corresponding quality control associated with each. The manufacture of prior art tires having a multiplicity of sidewall inserts 40a,40b,42a,42b, as shown in prior art tire 10 shown in FIG. 1, entails the following sequence of manufacturing steps in the part of the manufacturing process that takes place upon a tire assembly drum. First, the inner liner 34 is laid upon a conventional tire building drum (not shown), followed by the beads 36a,36b, followed by inserts 40a,40b, then by ply layer 30, inserts 42a,42b and then ply layer 32. Other tire components, which are not a part of the present invention, such as for example, the outermost elastomeric portions of the sidewall portions 77,78 and bead filler apexes 38a,38b can then be added.

In the present invention, as shown in FIG. 2, the use of a single wedge insert 59a,59b, each containing two stiffening reinforcement layers 72a,72b,73a,73b, accordingly simplifies the manufacturing process. That is, the use of single wedge inserts within each sidewall, eliminates the need to orient the two or more inserts in each sidewall portion such that they are optimally and uniformly positioned in relationship to one another and to the other tire structures.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A radial ply runflat tire having a tread; a carcass comprising a radial ply structure extending between two inextensible annular beads; a belt structure located between the tread and the radial ply structure; an inner liner; and two sidewalls, each of which is reinforced by a single wedge insert circumferentially disposed between the radial ply structure and the inner liner, each wedge insert comprising a crescent-shaped elastomeric layer having tapered ends extending radially toward the head and the tread, and having a first and a second wedge-insert stiffener layer circumferentially disposed within each wedge insert; the tire being characterized by:
   the second wedge-insert stiffener layer having a radial width which is greater than the radial width of the first wedge-insert stiffener layer;

the radially outermost end of the second wedge-insert stiffener layer being radially outside of the radially outermost end of the first wedge-insert stiffener layer;

the radially innermost end of the second wedge-insert stiffener layer being radially inside of the radially innermost end of the first wedge-insert stiffener layer;

the first wedge-insert stiffener layer being circumferentially disposed between the second wedge-insert stiffener layer and the inner liner;

the first wedge-insert stiffeners having a radial width that is preferably within the range of between 25 percent to 60 percent of the total radially oriented span of the respective wedge insert; and the second wedge-insert stiffeners having a radial width that is preferably within the range of between 60 percent to 90 percent of the total radially oriented span of the respective wedge insert.

2. The tire of claim 1 further characterized in that:

the first wedge-insert stiffeners have a radial width that is most preferably within the range of between 30 percent to 50 percent of the total radially oriented span of the respective wedge insert; and the second wedge-insert stiffeners have a radial width that is most preferably within the range of between 70 percent to 80 percent of the total radially oriented span of the respective wedge insert.

3. The tire of claim 1 further characterized in that:

the first and second wedge-insert stiffener layers include parallel-aligned cords.

4. The tire of claim 3 characterized in that:

the angular orientation of the first and second set of parallel-aligned cords are between 20 degrees and 55 degrees with respect to the circumferential direction CD.

5. The tire of claim 4 further characterized in that:

the first and second parallel-aligned cords are transversely oriented with respect to each other.

6. The tire of claim 5 further characterized in that:

the parallel-aligned cords are selected from the group consisting of wire monofilaments, nylon monofilaments, and metal cords.

7. The tire of claim 1 characterized in that:

the wedge-insert stiffener layers are constructed of parallel-aligned cords that are selected from the group consisting of wire monofilaments, nylon monofilaments, and metal cords.

* * * * *